(12) United States Patent
Ohman et al.

(10) Patent No.: US 9,708,041 B2
(45) Date of Patent: Jul. 18, 2017

(54) CANOE HAVING TWO DISCONNECTABLE HULL SECTIONS

(71) Applicant: POINT 65 SWEDEN AB, Solna (SE)

(72) Inventors: Richard Ohman, Maisoncelles Du Maine (FR); Tomas Ohman, Mariefred (SE)

(73) Assignee: Point 65 Sweden AB (SE)

( * ) Notice: Subject to any disclaimer, the term of this patent is extended or adjusted under 35 U.S.C. 154(b) by 0 days.

(21) Appl. No.: 14/986,960

(22) Filed: Jan. 4, 2016

(65) Prior Publication Data

US 2016/0194061 A1   Jul. 7, 2016

Related U.S. Application Data (63) Continuation of application No. 14/388,650, filed as application No. PCT/EP2013/056061 on Mar. 22, 2013, now abandoned.

(30) Foreign Application Priority Data

Mar. 28, 2012   (SE) ...................................... 1250309

(51) Int. Cl.
    *B63B 3/08*       (2006.01)
    *B63B 35/71*      (2006.01)
    (Continued)

(52) U.S. Cl.
    CPC .............. *B63B 35/71* (2013.01); *B29C 49/00* (2013.01); *B29C 49/4205* (2013.01);
    (Continued)

(58) Field of Classification Search
    CPC .................................. B63B 7/04; B63B 35/71
    See application file for complete search history.

(56) References Cited

U.S. PATENT DOCUMENTS

| 3,090,973 A | 5/1963 | Levinson |
| 3,348,246 A | 10/1967 | Vidal |
| (Continued) |

FOREIGN PATENT DOCUMENTS

| CN | 1554554 A | 12/2004 |
| CN | 1894128 A | 1/2007 |
| (Continued) |

OTHER PUBLICATIONS

Partial English Translation and Chinese Office Action mailed Mar. 14, 2016 in Chinese Patent Application No. 201380019974.8 (8 pages).

(Continued)

*Primary Examiner* — Edwin Swinehart
(74) *Attorney, Agent, or Firm* — Eric L. Sophir; Dentons US LLP (57) ABSTRACT

The present invention relates to a canoe comprising at least two hull sections and a joint for releasable connection of the first hull section to the second hull section, wherein the joint comprises a first mating means comprising at least one protruding member and at least one corresponding groove, provided in respective one of said hull sections, wherein the joint further comprises a second mating means comprising at least one projecting member and at least one corresponding groove, provided in respective one of said hull sections, wherein said first mating means is positioned at a lower portion of the respective hull sections compared to said second mating means.

19 Claims, 10 Drawing Sheets

(51) Int. Cl.
- *B63B 7/04* (2006.01)
- *B29C 49/00* (2006.01)
- *B29C 49/48* (2006.01)
- *B29C 49/64* (2006.01)
- *B29C 49/70* (2006.01)
- *B29C 49/42* (2006.01)
- *B29K 105/00* (2006.01)
- *B29L 31/30* (2006.01)

(52) U.S. Cl.
CPC .............. *B29C 49/48* (2013.01); *B29C 49/64* (2013.01); *B29C 49/70* (2013.01); *B63B 3/08* (2013.01); *B63B 7/04* (2013.01); *B29C 2049/4856* (2013.01); *B29K 2023/06* (2013.01); *B29K 2105/258* (2013.01); *B29L 2031/307* (2013.01)

(56) References Cited

U.S. PATENT DOCUMENTS

| | | | |
|---|---|---|---|
| 3,744,071 A * | 7/1973 | Bossler, Jr. | B63B 7/04 114/352 |
| 3,996,635 A * | 12/1976 | Wilkes | B63B 3/08 114/352 |
| 4,052,761 A | 10/1977 | Rilling | |
| 4,478,167 A | 10/1984 | Hart | |
| 2010/0326345 A1 | 12/2010 | Ohman et al. | |

FOREIGN PATENT DOCUMENTS

| | | |
|---|---|---|
| DE | 201 19 620 U1 | 8/2002 |
| FR | 2 953 803 A1 | 6/2011 |

OTHER PUBLICATIONS

Chinese Office Action (with English translation of the first two pages) dated Mar. 1, 2017 in Chinese Application No. 201380019974.8, 8 pages.

International Search Report and Written Opinion dated Aug. 26, 2013 corresponding to International Patent Application No. PCT/EP2013/056061, 11 pages.

* cited by examiner

CANOE HAVING TWO DISCONNECTABLE HULL SECTIONS

CROSS-REFERENCE TO RELATED APPLICATIONS

This application is a continuation of Non-Provisional patent application Ser. No. 14/388,650, filed Sep. 26, 2014, entitled Canoe Having Two Disconnectable Hull Sections, which claims priority to PCT/EP2013/056061, filed Mar. 22, 2013, which claims priority to Swedish Patent Application No. 1250309-0, filed Mar. 28, 2012, all of which are incorporated by reference in their entirety.

TECHNICAL FIELD

The present invention relates generally to canoes, and especially to a canoe comprising at least three sections. The present invention also relates to the manufacturing of such a canoe, and especially molding the hull sections.

BACKGROUND

A variety of versatile kayaks adapted for a wide range of specific use are available, such as long distance paddling, paddling in the archipelago or at sea. These kayaks are well adapted for their different purposes and show different character in regard of maneuverability, stability and speed but they all have the drawback that they are not specifically adapted for storing or transporting when they are not used. For boats having an open hull structure, there are known a great many different solutions to provide for transportability, but these may not easily be applied to canoes/kayaks having hollow water tight hulls, e.g. U.S. Pat. No. 4,025,761 and U.S. Pat. No. 4,478,167. In US2010326345 it has therefore been suggested to provide a canoe with multiple, joinable hull sections for easier storing and transport. However, there are certain drawbacks related to this model and there is a desire to provide an improved design. Also DE 20119620 discloses a kayak according to this principle, but which also presents certain drawbacks.

Modern kayaks are often rotation molded in polyethylene (PE). The rotation molding process is rational and economic, especially in comparison to the manufacture of fiberglass boats. The molding technology provides strong and durable kayaks. Although rotation molding provides many advantages, in some cases it is desired to instead use blow molding technique, e.g. due to that blow molding is an easier and quicker process compared to rotation molding which leads to reduced manufacturing costs and a less expensive end product. However, it has shown that blow molding is associated with difficulties due to uneven distribution of the material (PE) during the molding process which could easily result in undesirable and unpredictable weaknesses in the molded end product.

OBJECTS OF THE INVENTION

It is an object of the present invention to provide a canoe comprising joinable hull sections which is easily stored and transported, which may be easily and quickly mounted together/disassembled and where matching between hull sections is optimized leading to a very strong and reliable joining of the hull sections where the joining parts of each hull section at the same time are minimized in size to occupy little space when the canoe is disassembled. Further objects of the present invention will become clear from the following description.

SUMMARY OF INVENTION

The objects of the invention are achieved by means of a canoe comprising at least two hull sections, and a joint for releasable connection of the first hull section to the second hull section, wherein the joint comprises a first mating means comprising at least one horizontally protruding anchoring member and at least one corresponding groove, wherein preferably the groove protruding is arranged on one of the at least hull sections (e.g. on the frontal hull section) and the anchoring member is arranged on the other, mating hull section (e.g. the rear hull section). The joint further comprises a second mating means comprising at least one projecting member and at least one corresponding indentation matching the projecting member, wherein the projecting member is arranged on one hull section and the indentation is arranged on the other, mating hull section. Preferably said first mating means is positioned at a vertically lower portion (at the bottom portion) of the respective frontal and rear hull sections compared to said second mating means. The present invention further relates to a method of manufacturing such a canoe.

Preferably the height of a hull section is at least 15% of the longitudinal length of a hull section, more preferably at least 20%. Such dimension leads to a beneficial positioning of said first and second mating means in relation to each other, where the first mating means is positioned at a vertically lower portion (at the bottom portion) of the respective hull sections compared to said second mating means. Preferably the first mating means is arranged substantially at the lowermost half of the height of a hull section and the second mating means is arranged at the uppermost half of the height of a hull section. The position of the first mating means compared to the second mating means leads to cooperation between the first and second mating means to create a strong locking between joined-together hull sections. The locking cooperation between the mating means will be further described in the detailed description. Thus the first and second mating means are arranged to cooperate to withstand substantial vertical-, longitudinal-, side- and torsional forces, wherein the lowermost first mating means is arranged to withstand stronger forces than the uppermost second mating means.

In the following description and the appended claims the terms "vertical" and "horizontal" are to be put in relation to a canoe positioned so that it is resting on the hull on a planar, horizontal surface.

The present invention provides a canoe that is easier to store and transport than canoes of known art. The canoe according to the present invention is still being versatile, strong and durable in regard of its primary use as a paddling boat. Thanks to the invention there is provided a divisible canoe, such as a kayak, comprising at least two molded hull sections, where each hull section is optimized in dimension with regards to its volume so that it occupies minimal storage space while still comprising the necessary features to provide a safe and strong coupling when hull sections are joined together into a unitary canoe.

According to a preferred embodiment said at least one projecting member and said at least one corresponding/matching indentation of said second mating means have a substantially longitudinal mating direction. According to yet another preferred embodiment said projecting member and said corresponding indentation of the second mating means are dimensioned to withstand substantial side forces and torsional forces.

The design of the joint for releasable connection results in a very durable and strong locking engagement between two hull sections, where the first and second mating means cooperate to withstand substantial vertical forces as well as side- and torsional forces. The specific design of the joint leads to many advantages. The relative position of the first and second mating means results in a very reliable locking due to the locking cooperation which arises between the locking parts of the joint once the canoe is assembled. It has shown that the locking is so reliable that it fulfills the safety requirements of interlocking function even when the projecting members have small dimensions and even when projecting a relatively short distance in a horizontal longitudinal direction. The relative small dimension of the locking parts is beneficial since it will keep the overall dimension of each hull section at a minimum size, resulting in very compact hull sections which of course is an advantage when transporting and/or storing a disassembled canoe. Another advantage with relatively small locking parts is that the joining and separating of hull sections becomes very easy and effortless and therefore also quick. In a preferred aspect of the invention the protruding member of the first mating means of said joint protrudes in a longitudinal horizontal direction from the bulkhead portion of the respective hull section. Preferably the protrusion protrudes a distance in the longitudinal direction of between 2-8%, preferably between 3-5% of the total length of the respective hull section. According to one aspect of the invention the canoe comprises a locking arrangement for locking said hull sections together after they are joined together via the first and second mating means, said locking arrangement preferably including a two-part clasp and being arranged to lock reciprocal movement of said hull sections in the mating direction. When the hull sections have been connected via said joint (first and second mating means) and fastened by means of the locking arrangement, the hull sections are interconnected in three ways: at the lower first mating means, at the upper second mating means and at the position of the locking arrangement. The locking arrangement is preferably positioned at the upper deck side of the canoe so that a user may easily adjust it e.g. from a seated position. Once having assembled the canoe, the hull sections are held together in a very reliable and tight locking arrangement and constitute more or less one integrated unit.

The present invention thereby provides a canoe having sections that can be connected for use as a boat and separated for transport and storing. Particular advantages compared to other solutions are the instant and effortless joining and separating of the parts where no tools, screws or other loose parts are needed and the strength of the canoe that in its self resists the forces involved through the weight of the paddler and gear and the forces of the elements, particularly the pressure created by waves. Other known solutions are dependent for their strength in the joining together of the parts by screws and other means, but the canoe according to the present invention is self supported and the buckles used are only to keep the parts from sliding apart and have no bearing on the strength. Further advantage is that the new joint design enables for very compact hull sections while at the same time succeeds in providing a strong enough interlocking between the hulls. The overall dimension of each hull section is thus minimized compared to known variants of divisible canoes, where the interlocking parts of the hull sections often occupies a lot of space in a longitudinal direction resulting in an overall larger dimension of each hull section.

Preferably the sections are blow molded or rotation molded in a polymer, such as polyethylene. Preferably the canoe is a sit-on-top canoe.

According to a preferred aspect of the invention each of said hull sections is blow molded, and said at least one horizontally protruding member and said at least one corresponding groove of the first mating means are molded into bulkheads of each of said respective hull sections during the blow molding procedure so that the components of the first mating means are integrated into the hull structure. Blow molding has previously been used for manufacturing canoes and kayaks, however it has proven to be rather difficult to blow mold large products which comprises distinct irregularities (such as protrusions or grooves) in the product surface since the material is unevenly distributed during the blow molding process and it is simply very hard to ensure that the blow molded polymer becomes thick enough over the entire structure. Often, any irregular sections (e.g. grooves, protrusions, projections, indentations) in the structure of the end product have shown to become undesirably weak due to irregular distribution of plastic material during the blow molding procedure. Thus, blow molding is a manufacturing method which is merely used e.g. for producing hollow, even parts, e.g. an entire canoe outer shell, and even then it is necessary to strengthen certain sections (e.g. the frontal and rear portions of the canoe) with additional material after blow molding in order to achieve an acceptable strength of the walls.

However, the specially adapted design of the joint according to the present invention leads to that the hull sections, including the protrusions and grooves, can be successfully manufactured by means of blow molding despite the difficulties involved. One reason for this is that the protrusions and grooves of the joints are dimensioned in order for enough molding material to cover the irregularities so that the resulting blow molded wall doesn't get too thin (and weak). The irregular structures (e.g. protrusions and grooves) are dimensioned so that they are small enough to be successfully blow molded and at the same time designed to provide a safe and strong interlocking. Moreover, the position of the first and second mating means respectively allow for a favorable shape of the mold shells used in the blow molding procedure when forming the hull sections. By adapting the shape of the (usually two) mold tool halves and their mutual alignment with respect of the locking parts of the joint, it is possible to optimize the molding procedure and safeguard that the molded material (usually PET) will be evenly spread inside the mold tool cavity and cover any protrusions, grooves and indentations with enough thickness to form a uniform and durable wall.

According to one aspect of the invention, in order to optimize the blow molding of a hull section it is preferred that the portion of the hull which comprises the joint portion (i.e. including mating means) is kept in a downward orientation (i.e. pointing downwards) during the molding procedure. This way, it is possible to benefit from gravity for guiding the molding material to evenly cover irregularities of the joint portion of the respective hull section.

According to another aspect of the invention a significant step is created in the parting line at the bulkhead portion of the respective hull sections, where the mold halves come together, resulting in a difference in level along the parting line. This way the parting line is adapted to the position of the connection features for the purpose of getting the needed strength/plastic thickness where it is desired in order to make the connection features of the first and second mating means sufficiently strong.

According to yet another aspect of the method according to the invention the parting line on the outboard edges of the canoe is raised so that it extends closer to the top deck portion than to the bottom portion of the canoe. This allows the seat, footwells and cargo area to be formed successfully.

According to yet another aspect of the method according to the invention the overall shape of each hull section is adapted to be able to succeed with blow molding of the hull sections. For instance the dimensions of the guide fin at the rear hull section of the canoe is reduced in depth compared to other, rotation molded canoes, to avoid molding failure or thin plastic wall.

Thanks to being able to blow mold the hull sections several advantages are achieved. The overall manufacturing process is much quicker compared to other manufacturing methods and thus the end-product will be less expensive. The blow molding process further results in stronger material compared e.g. to rotation molded products. Also, blow molding has the advantage of minimal shrinkage after molding meaning the shape of the end product essentially corresponds to the one defined by the mold tools. This is especially advantageous in case of the present invention since it leads to improved and more exact matching of the first and second mating means: in other words it is possible to minimize mismatch between joined together hull portions and interlocking is improved both with regards to tightness, reliability and strength.

According to another aspect of the invention the canoe comprises at least three hull sections, and joints for releasable connection of each hull section to the adjacent hull section, wherein each hull section comprises means for mating the adjacent hull section of the joint. Thus a canoe according to the invention is modular in the sense that a frontal and rear hull section can be interconnected via one—or more than one—middle hull sections leading to the possibility of assembling canoes of different lengths depending on how many middle hull sections are used. In other words, the length of the canoe is optional. A one-man canoe can be provided by mounting together two of the sections, and a two-man canoe can be provided by mounting three sections.

According to one aspect of the invention the protruding/projecting members of each of said first and second mating means of a joint are located on one and the same hull section (preferably the rear hull section) and the mating groove as well as the 7 indentations of each of said first and second mating means are located on one and the same hull section (preferably the frontal hull section). Said rear hull section also comprises a seat portion arranged for a user of the canoe to sit on. This means that the protruding/projecting members of a joint section are preferably located on the same (rear) hull section and all mating grooves/indentations are locates on the same (frontal) hull section. A design where all protruding and projecting parts are positioned on the same (rear) hull section is advantageous e.g. for storage reasons. A design where all projecting/protruding parts are gathered on the same hull means that the mating hull does not need to comprise any projecting/protruding parts at all—only mating grooves and indentations—and may thereby be minimized in size. Thus such design enables for optimized and reduced dimensions of the hull sections which constitutes a canoe: the mating (frontal) hull section does not comprise any protrusions and will therefore occupy as little space in the longitudinal direction as possible. At the same time, thanks to the design of the mating means of the divisible canoe said protrusions are optimized in the sense that they are made as small as possible while still providing a strong interlocking between hull parts meaning that also the hull part which comprises the protruding members is minimized in size.

The invention also provides a method for manufacturing such a canoe, including the step of blow molding the two hull sections and the mating means, wherein the mating means of each hull section is molded into the respective hull section. Blow molding the joints into the hull sections when molding the hull sections facilitates keeping the hull sections watertight and also keeps the manufacturing fast and simple.

BRIEF DESCRIPTION OF THE DRAWINGS

The invention will be described in greater detail below with reference to the accompanying drawings, wherein.

DETAILED DESCRIPTION

In the following, for purposes of explanation and in order to provide an understanding of the present invention, exemplifying embodiments are presented. However, it will be apparent to one skilled in the art that the present invention may be practiced in other embodiments that depart from the specific details of these examples. Moreover, description of those details of a canoe in accordance with the invention that are similar to corresponding details of an ordinary non-dividable canoe have been omitted.

Figure 1A:
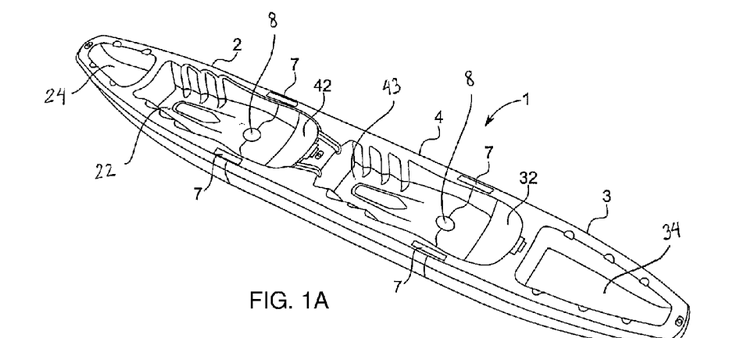
FIG. 1A illustrates a canoe having three hull sections when joined together.

FIG. 1A illustrates a canoe 1 comprising three hull sections 2, 3, 4: a frontal 2, a rear 3 and a middle section 4. The hull sections 2, 3, 4 are floatable and make up a canoe when joined in the longitudinal direction, from stem to stern. The rear section 3 and the middle section of the canoe 1 each comprises a seat portion 32, 42, i.e. the canoe shown in FIG. 1A is a tandem configuration intended for two persons. The top deck side of the canoe 1 comprises cargo areas 24, 34, seat portions 32, 42 and leg spaces 22, 43. Further at each seat portion there is preferably arranged a storage space 8 which preferably has a cross section arranged to fit a water bottle.

Figure 1B:
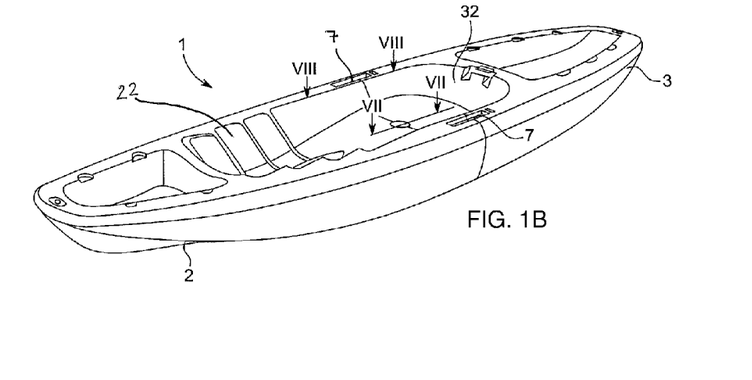
FIG. 1B illustrates a canoe having two hull sections when joined together.

FIG. 1B is a single-user canoe 1 comprising two hull sections 2, 3 joined together in a locked configuration: a frontal 2 and a rear 3 section where said rear section 3 comprises a seat portion 32.

Figure 2:
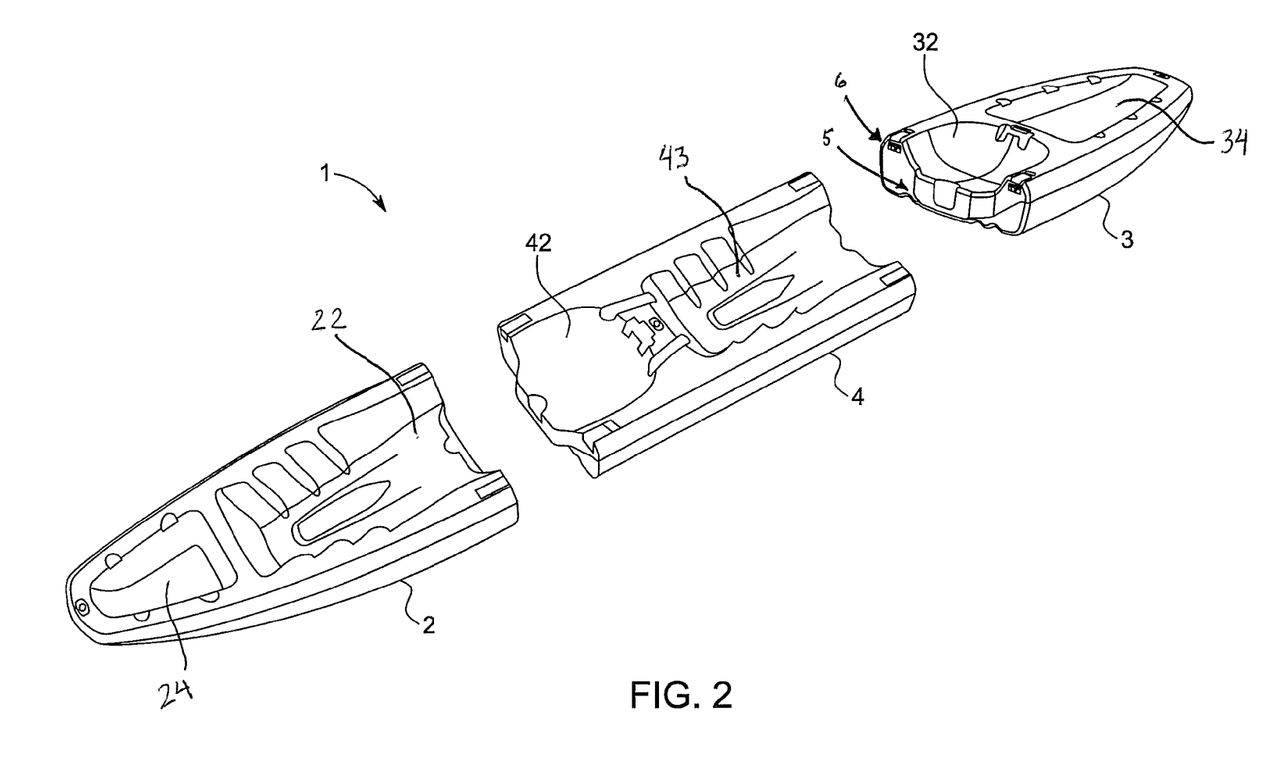
FIG. 2 illustrates a canoe having three hull sections when the hull sections are slightly apart.

FIG. 2 shows the same canoe 1 as shown in FIG. 1A with the three hull sections 2, 3, 4 slightly apart partially exposing the connecting features arranged to releasably join said hull sections together. The hull sections 2, 3, 4 are joined at their respective joint portions in a substantially longitudinal mating direction by mating means 5, 6 comprising protruding members and corresponding grooves arranged in respective hull section 2, 3, 4 as will later be described in more detail. The joint is self-strengthening and self-locking. The protruding member and the corresponding groove are designed to withstand substantial side forces and torsional forces.

The separate hull sections 2, 3, 4 of a canoe 1 according to the present invention are designed as watertight hollow units which are preferably created by means of blow molding and where the different features and structures of the canoe (e.g. the seat, protrusions and grooves) are created into the hull sections directly during molding procedure.

In FIGS. 3A-3D and FIG. 4 there are shown different views of a frontal hull section 2 according to one embodiment of the invention. The frontal hull section 2 has a frontal portion 20 and an opposite, rear joint portion 21, where said joint portion 21 corresponds to the mating portion—i.e. intended to be joined to a mating hull. The joint portion 21 is herein also referred to as a bulkhead portion. The components of said first 5 and second 6 mating means which enables joining of the frontal hull section 2 to a mating middle 4 or rear 3 hull are arranged at the joint portion 21.

Figure 3A:
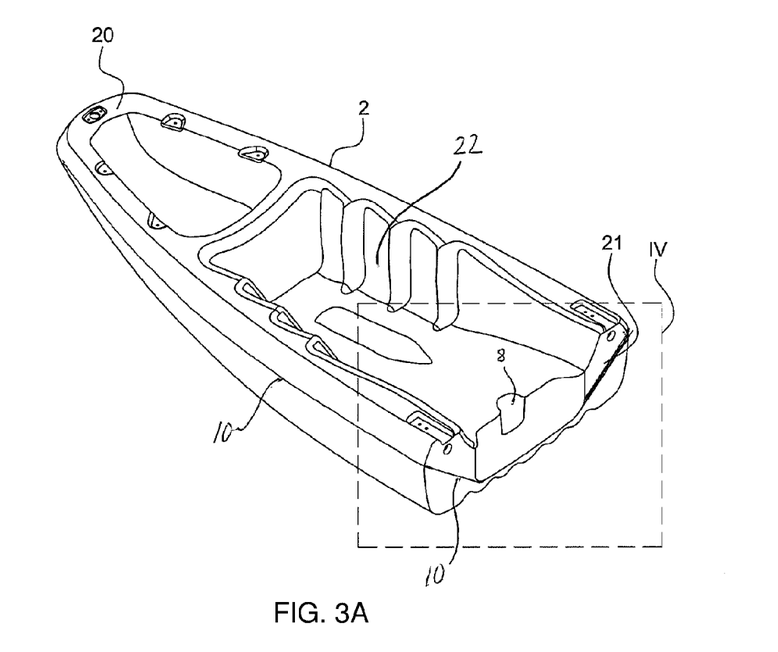
FIG. 3A illustrates a frontal hull section according to one embodiment of the invention from a perspective view.
Figure 3B:
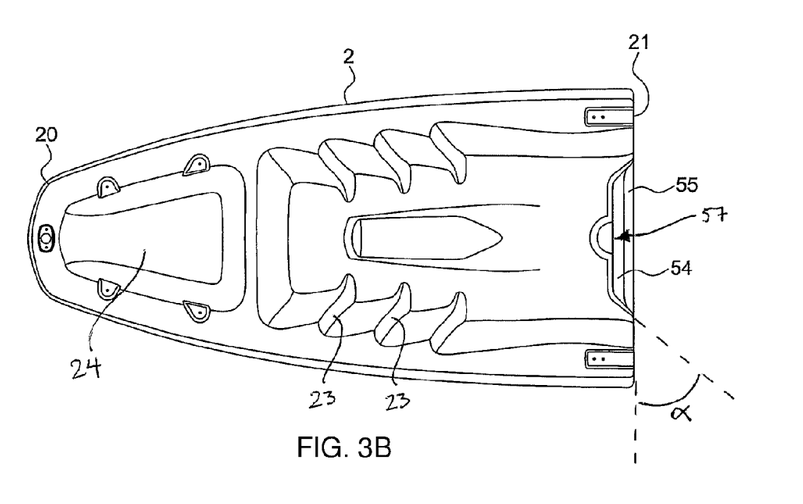
FIG. 3B illustrates a frontal hull section according to one embodiment of the invention from a top view.

As seen in FIG. 3B the top portion of the frontal hull 2 is preferably arranged with structures such as footwell 22 and cargo area 24 integrated into the shell of the hull. The footwell 22 comprises a number of integrated foot supports 23 along each vertical side of the well. In the example of FIG. 3B the footwell 22 is arranged with foot supports 23 of four different sizes so that the canoe 1 is adapted to use by persons of various height.

Figure 3C:
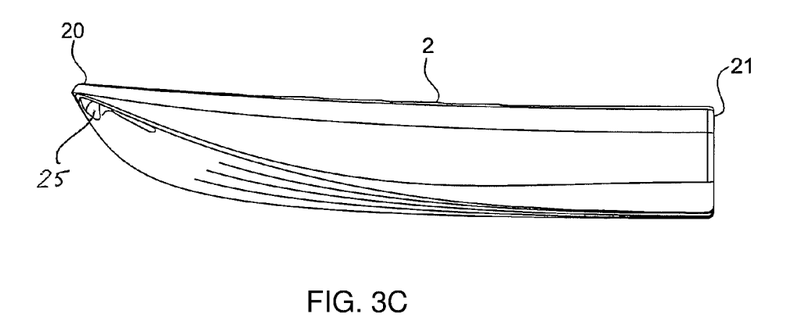
FIG. 3C illustrates a frontal hull section according to one embodiment of the invention from a side view.
Figure 3D:
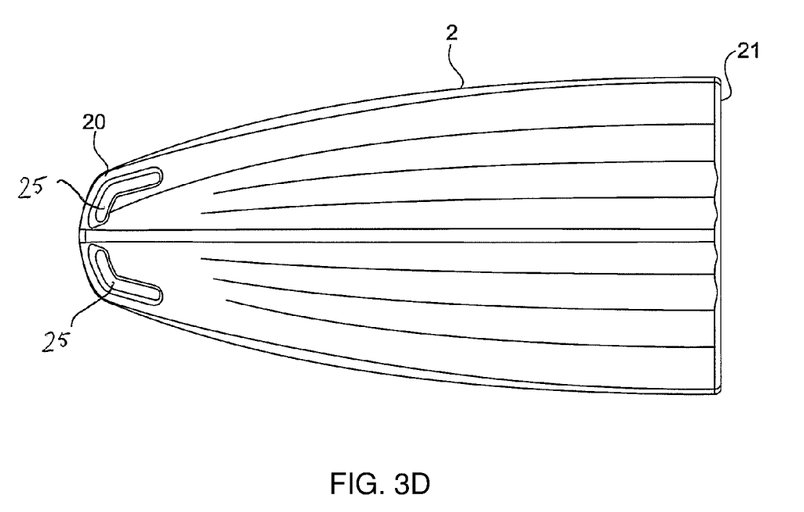
FIG. 3D illustrates a frontal hull section according to one embodiment of the invention from a bottom view.

The bottom of the frontal hull section 2 is seen in FIGS. 3C-D. Preferably the frontal portion of the front hull 2 comprises a grab handle 25 integrated in the hull structure and the bottom surface (FIG. 3D) comprises longitudinal strakes also being integrated into the hull structure during manufacturing of the hull.

Figure 4:
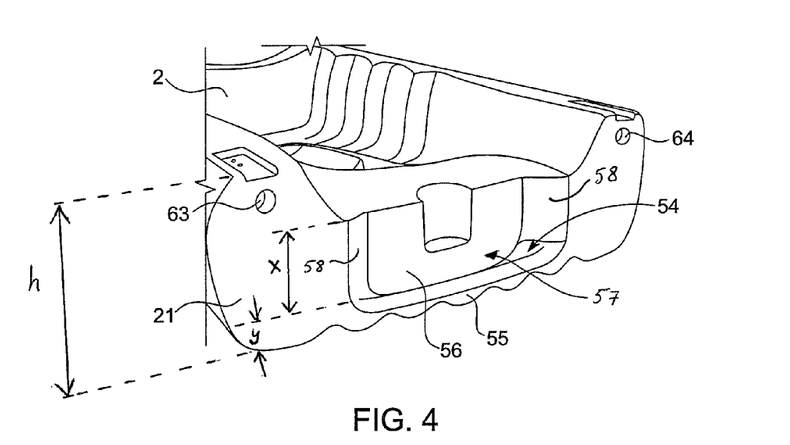
FIG. 4 is a close-up view according to IV in FIG. 3A illustrating mating means for joining two adjacent hull sections.

The joint portion 21 (bulkhead portion 21) of the frontal hull 2 is arranged with first 5 and second mating means 6, as shown in enlarged FIG. 4. The first mating means 5 of the frontal hull 2 is arranged centrally at the lower part of the hull joint portion 21 and comprises a receiving space 57 arranged with a groove 54 and a ridge 55 as well as a stabilizing surface 56 and side walls 58. According to one embodiment the stabilizing surface 56 is essentially vertical and flat, however the skilled person understands that the surface may comprise other shapes than flat ones. According to one embodiment the side walls 58 are oblique side walls having a predetermined angle a in relation to the bulkhead end surface 21. Angle a is shown in FIG. 3B. Although the side walls are not in any way restricted to being oblique, such a design provides advantages in terms of simplified manufacturing of the hull section 2 as well as easier and quicker assembly of two hulls due to that the oblique side walls will result in that a mating protruding member 51 will be guided into place to fit with the receiving space 57.

According to the embodiment seen in FIG. 4 the receiving space 57 with said stabilizing surface 56 has a height x and the retaining ridge 55 has a height y. The total height of the hull 2 is denoted h. Preferably, height x is between 0.7*h and 0.4*h. Preferably height y is between 0.05*x and 0.5*x.

The second mating means 6 comprises two female indentations 63, 64 arranged at the upper part of the hull joint portion 21 and positioned off-center and at a distance from each other close to the port and starboard side of the hull. The function of the first and second mating means, and their cooperation with features of a mating hull section, will later be described in more detail.

As seen in FIG. 3C and FIG. 3D as the components of the first and second mating means of the frontal hull portion 2 are integrated with the hull body and do not result in any additional length in the longitudinal direction.

In FIGS. 5A-D and FIG. 6 there are shown different views of a rear hull section 3 according to one embodiment of the invention. The rear hull section 3 has a rear portion 30 and an opposite, frontal joint portion 31, where said joint portion 31 corresponds to the mating portion (also referred to as bulkhead portion 31)—i.e. intended to be joined to a mating, e.g. frontal 2 or middle 4, hull section. The connection features of said first 5 and second 6 mating means enabling joining of the rear hull section 3 to a mating hull are arranged at the joint portion 31.

Figure 5A:
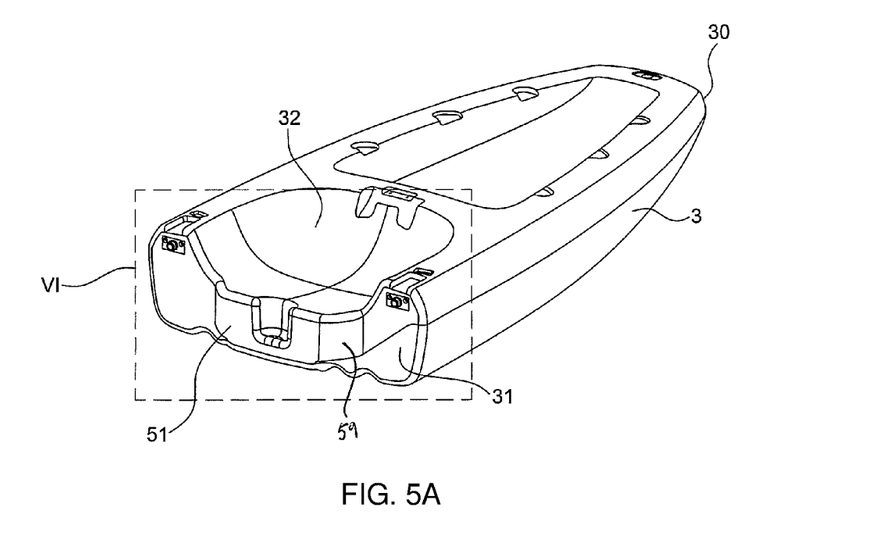
FIG. 5A illustrates a rear hull section according to one embodiment of the invention from a perspective view.
Figure 5B:
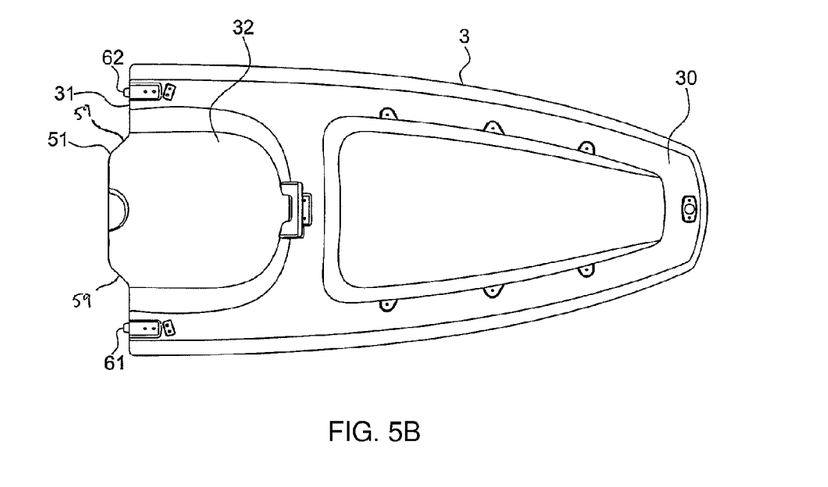
FIG. 5B illustrates a rear hull section according to one embodiment of the invention from a top view.
Figure 5C:
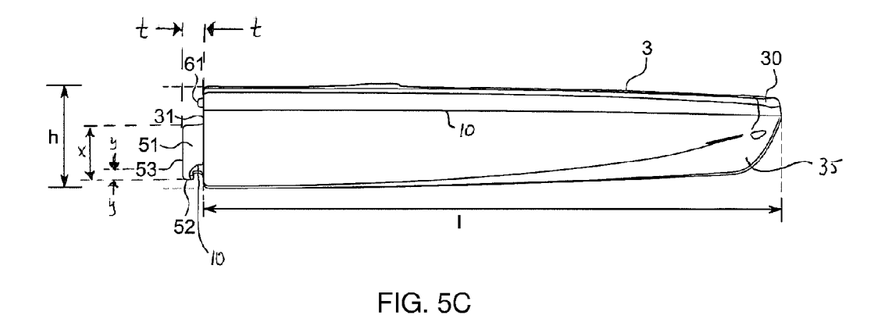
FIG. 5C illustrates a rear hull section according to one embodiment of the invention from a side view.
Figure 5D:
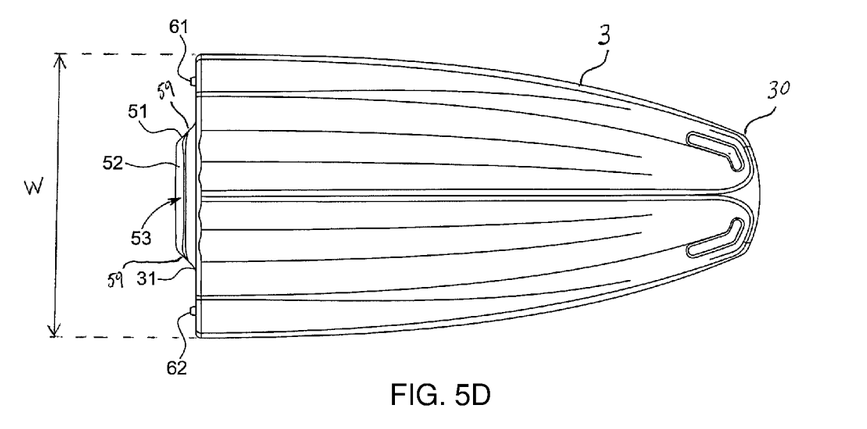
FIG. 5D illustrates a rear hull section according to one embodiment of the invention from a bottom view.

As seen in FIG. 5B the top deck portion of the rear hull 3 is preferably arranged with structures including a seat 32 integrated into the shell of the hull for enabling a user to sit safely on the hull 3. The joint portion 31 of the rear hull 3 is arranged with first 5 and second mating means 6, as shown in enlarged FIG. 6. The first mating means 5 comprises a lowermost, centrally positioned protruding member 51 having an anchoring portion 52 pointing in a downward direction, as well as a frontal stabilizing surface 53 and side portions 59. According to one embodiment the frontal stabilizing surface 53 is essentially vertical and flat, however the skilled person understands that the surface may have other shapes than flat ones such as for instance curved surfaces. Moreover, according to one aspect of the invention the side portions 59 are oblique as seen in FIG. 5D. The stabilizing surface 53 has a height x which equals the height x of the receiving space 57, meaning that the protruding member 51 is dimensioned to fit into the receiving space so that the frontal stabilizing surface 53 and side portions 59 of the protruding member 51 abuts the stabilizing surface 56 and the side walls of the receiving space 57 when two hulls 2, 3 are in an interconnected configuration.

The protruding member 51 protrudes in a longitudinal horizontal direction and preferably extends transversally along a central, lower section of the hull 3. As illustrated in FIG. 5C the protrusion 51 protrudes a distance t in the longitudinal direction. Preferably the distance t is between 2~8%, preferably between 3~5% of the total length 1 of the respective hull section 3. Thus the first locking means 5 provides a sufficiently strong and robust locking while at the same time occupy minimal space in the longitudinal direction. In other words such design provides stability and strength when joining two hulls together, and also contributes to that the first 5 and second 6 mating means can be small in dimension while still enable for a reliable interlocking.

Figure 6:
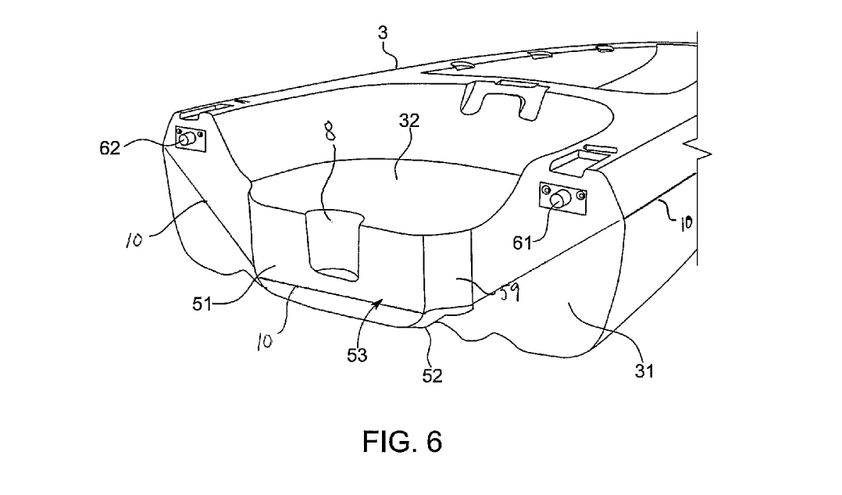
FIG. 6 is a close-up view according to VI in FIG. 5A illustrating mating means for joining two adjacent hull sections.

The second mating means 6 in the rear hull 3 comprises two projecting members 61, 62 arranged at the upper part of the hull joint portion 31 and positioned at a distance from each other close to the port and starboard side of the hull.

The function of the first and second mating means, and their cooperation with features of a mating hull section, will be described in more detail and is illustrated e.g. in FIG. 7 and FIG. 8.

Figure 7:
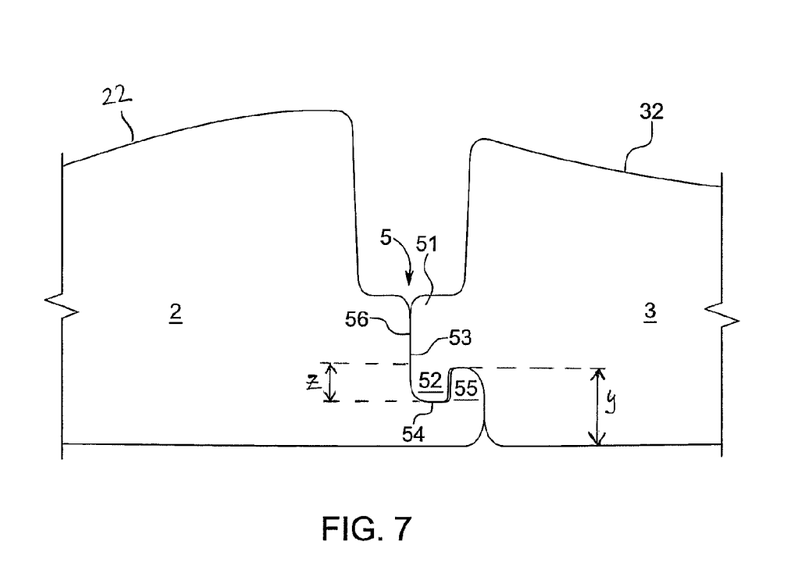
FIG. 7 is a cross sectional view according to line VII in FIG. 1B illustrating two hull sections joined together by first mating means.

FIG. 7 is a cross sectional view along line VII in FIG. 1B and illustrates a preferred design of said first mating means 5 comprising said protruding anchoring member 51 integrated with the rear hull section 3 and at least one mating groove 54 created in the frontal hull section 2.

Figure 8:
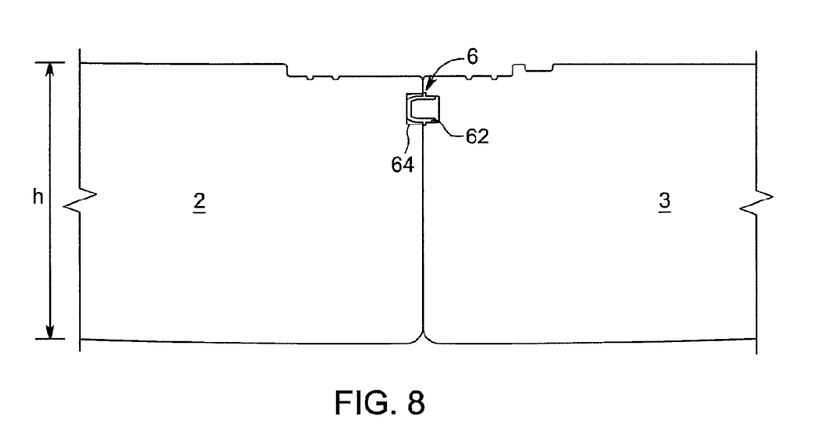
FIG. 8 is a cross sectional view according to line VIII in FIG. 1B illustrating two hull sections joined together by second mating means.

Furthermore FIG. 8 is a cross sectional view along line VIII in FIG. 1B and illustrates a preferred design of said second mating means 6, located at a position vertically above the first mating means 5 at the respective hull sections 2, 3. In FIG. 8 there is seen a projecting member 61 of the rear hull 3 inserted into a corresponding indentation 63 of the frontal hull 2 to create an interlocking.

The joint for releasable connection of two hull sections 2, 3 is now to be further described with reference mainly to FIGS. 3-9. In FIGS. 3A-3D and FIG. 4 there are shown different views of a frontal hull section 2 and in FIGS. 5A-D and FIG. 6 there are shown different views of a rear hull section 3. Moreover FIGS. 7 and 8 show cross sections according to lines VII and VIII in FIG. 1B showing two hull sections 2, 3 joined by means of the first 5 and second 6 mating means respectively according to one embodiment of the invention.

In the following, joining of frontal 2 and rear 3 hull sections is to be described, however the same principle is relevant for the joining of any number of hull sections, whether it relates to the assembly of a canoe comprising only two hull sections to form a single-user canoe, as in the present example, or more than two hull sections to achieve a tandem configuration.

The first frontal hull section 2 can be connected to the rear hull section 3 by means of a joint for releasable connection comprising a first mating means 5 wherein said protruding member 51 on the rear hull 3 is arranged to fit within said receiving space 57 in the frontal hull 2 so as to create an interlocking between the hulls 2, 3. The protruding member 51 is an integrated part of the bulkhead portion 31 of the rear hull section 3, and in a corresponding manner the receiving space 57 is also integrated in the wall structure of the bulkhead portion 21 of the frontal hull 2. The receiving space 57 comprises a groove 54 and a retaining ridge 55. Further, the protruding member 51 which projects horizontally in a longitudinal direction has an anchoring portion 52 pointing downwards positioned centrally at the lower portion of the rear hull section 3.

In a corresponding manner the groove 54 is in the form of a mating female groove 54 arranged with said retaining ridge 55 positioned at the lower portion of the frontal hull section 2. Said anchoring portion 52 is arranged to fit within the groove 54 and being retained by the ridge 55, as also shown in the cross section of FIG. 7. Herein is also seen that said anchoring portion 52 of the protruding member 51 is arranged to point downwards a distance z, where the protruding member 51 is arranged at a distance y from the bottom side of the hull 3, said distance y being equal to the height of the retaining ridge 55 of frontal hull 2. Preferably z is between 0.4*y and 0.6*y.

In a preferred embodiment of the invention the anchoring portion 52 is arranged as a narrow elongated ridgeline protruding downwards from the protruding member 51 and extending transversally along a portion of the joint side 31 of the rear hull section 3. The skilled person understands that is would also be possible to, instead of one continuous ridgeline, provide a number of separate hook members with matching grooves arranged in the frontal hull. However, experience has shown that a joint which comprises a ridgeline anchoring portion 52 as seen in FIG. 5-6, has advantages with regards to material strength and robustness.

The function of the first mating means 5 is illustrated in FIG. 7. Once the anchoring portion 52 is fitted into the groove 54 the hull sections 2, 3 are stabilized in relation to each other in a longitudinal direction as well as a vertical direction. The protruding member 51 is fitted into the receiving space 57 and the anchoring portion 52 is fitted into the groove 54 in a tight gripping engagement seen in FIG. 7. In a preferred embodiment the first mating means 5 also comprises opposing surfaces including said essentially vertical surface 56 and oblique side walls 58 of the receiving space 57 and said stabilizing surface 53 and oblique side portions 59 of the rear hull section 3. In a locked position where two hull sections 2, 3 are joined together the opposing surfaces 53, 56 and oblique side walls/portions 58, 59 are arranged to abut each other to create a lock which stabilizes the first mating means 5 and contribute to withstanding torsional-, side- and bending forces.

In order to further secure the locking between the hull sections the joint comprises a second upper mating means 6. The second mating means 6 is located at a position vertically above the first mating means 5 at the respective hull sections 2, 3. According to one embodiment the second mating means 6 comprises at least two projecting members 61, 62 at the rear hull section 3 and at least two corresponding female indentations 63, 64 created in the frontal hull section 2, where said projecting members 61, 62 are arranged to be inserted into the at least two matching female indentations 63, 64 for safe interlocking of the respective hull sections 2, 3. Preferably the projection members 61, 62 and the matching indentations 63, 64 are arranged with a distance in between at the upper portion of each hull section. Thanks to this design locking of the second mating means 6 will prevent any torsional movement of hull sections in relation to each other.

Assembly of hull sections 2, 3 of a canoe 1 according to the invention will now be described.

Two hull sections 2, 3 are connected by first mating the anchoring portion 52 of the protruding member 51 with the corresponding female groove 54 (i.e. placing the male anchoring portion 52 of the hook member into said female groove 54). In this position the first mating means has created a joint-like interconnection between hull parts 2, 3. First mating means 5 is hereby locked and the lower portions of the hull sections 2, 3 are fixed in a longitudinal direction in relation to each other.

It is however to be understood that the invention is in no way restricted to the protruding member 51 being positioned on a particular hull section. Evidently the locking would function also if the protruding member 51 would be arranged at the frontal hull section 2.

The hull sections 2, 3 are now joined together at their lower hull portions. Next, the upper portions of the respective hull sections 2, 3 are moved towards each other in a pivoting movement (i.e. the hull sections are "bent" towards each other), all the time while said first mating means 5 is stabilizing the lower portions of the hull sections, until the at least two projecting members 61, 62 at the upper portion of the rear hull section 3 meet and are introduced into the matching female indentations 63, 64 of the frontal hull section 2. The interlocking by the second mating means 6 is illustrated in FIG. 8. Once the projecting members 61, 62 are fully inserted into the matching indentations 63, 64 also the second mating means 6 is locked. The female indentations 63, 64 of the second mating means 6 have an inner wall surrounding the male projections 61, 62 in two perpendicular directions, the vertical direction and the transversal direction, restraining relative movement of the hull sections 2, 3 in the vertical and the transversal directions. It is to be understood that the projecting members 61, 62 and the corresponding indentations 63, 64 may be arranged at either of the frontal or rear hull section, however due to dimensional advantages it is preferred that all projecting/protruding members are arranged on one and the same hull section. The projecting members 61, 62 may be integrated into the structure of the hull section during the blow molding procedure, or they may be attached in any conventional way onto the hull 3 after manufacturing.

In a preferred embodiment the seat portion 32 is arranged on the top deck of the rear hull section 3 adjacent to the bulkhead portion 31, leading to that the seat portion 32 is also positioned adjacent to the protruding member 51 of the releasable joint. In a preferred design the seat 32 is positioned between the center of buoyancy of the rear hull 3 and the joint portion 31. Thus, the weight from a user sitting on the seat 32 will lead to that the center of gravity will be positioned in front of the center of buoyancy causing the rear hull 3 to pivot in a forward direction. Hereby a locking momentum arises causing the anchoring portion 52 to be pressed downwards into the groove 54. As a result a contrary pivoting action arises from the frontal hull 2 and the stabilizing surfaces 53, 56, 58, 59 of the first mating means 5 are also pushed towards each other in a locking configuration. Thanks to this design the weight from a user padding the canoe will lead to enhanced locking force of the first mating means 5. In other words the design of the first mating means 5 is adapted to cooperate with the weight from a user to improve the locking between hull sections.

The first 5 and second 6 mating means cooperate to interlock the hull sections 2, 3 in longitudinal, vertical and transversal directions in a firm and safe manner.

Preferably the height h of a hull section is at least 15% of the longitudinal length 1 of a hull section 2, 3, more preferably at least 20%. Such dimension leads to a beneficial positioning of said first and second mating means in relation to each other, where the first mating means is positioned at a vertically lower portion (at the bottom portion as seen in FIG. 7) of the respective hull sections compared to said second mating means, and to that the first and second mating means cooperate to create a strong locking when the hull sections are joined together. Once two hull sections 2, 3 are joined and the first 5 and second 6 mating means have been locked together the anchoring protruding portion 52 will keep the lower portions of the canoe together both in a longitudinal direction and, thanks to the hook-like shape of the anchor, in a vertical direction. At the same time the upper second mating means 6 will create an interlock preventing any relative transversal and vertical motion between hull sections at the upper portions of the canoe. Furthermore, in case of the preferred design where the protruding member 51 is arranged on the same hull section as the seat area 32, a person who is sitting on top of the canoe 1 will further contribute to an even safer interlock between hull sections since the weight from the person will cause the rear hull section 3 to be pushed downwards and therefore also the anchoring portion to get more efficiently fixated into the matching groove 54 of the frontal hull section 2.

Figure 10A:
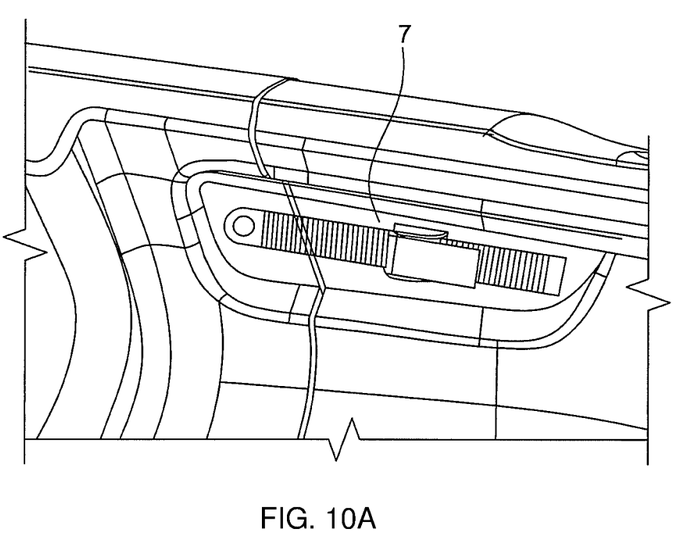
FIG. 10A illustrates locking means for securing the joint in place when locked.
Figure 10B:
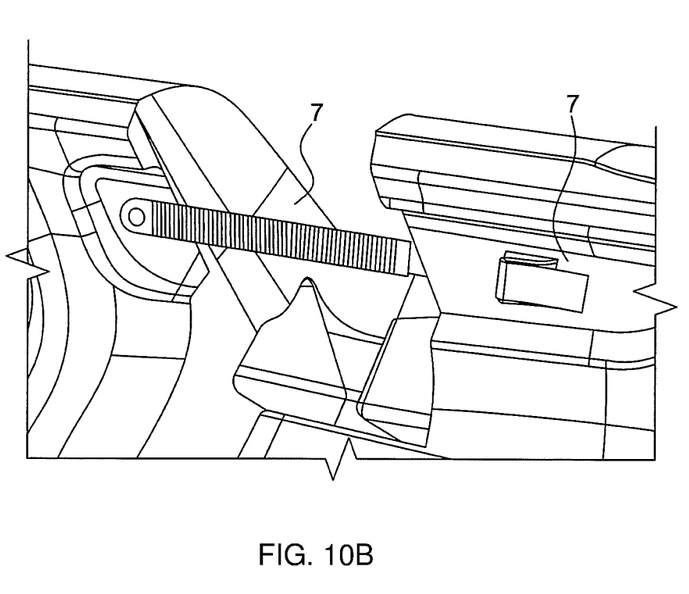
FIG. 10B illustrates the locking means in place when open.

After joining of the hull sections 2, 3 by locking the first 5 and second 6 mating means, they can be further locked together by locking arrangement 7 (see FIGS. 10A-B arranged to interlock and secure the hull sections together precluding relative longitudinal movement of the sections (i.e. lock reciprocal movement of said hull sections in the mating direction).

FIG. 10A shows the clasp in its locked position when in use for locking two hull sections together. FIG. 10B shows the clasp in place in its open position. Although in FIGS. 10A-B the two-part clasp 7 is shown to be arranged at the inner, vertical side of a canoe it is equally possible to position the clasp 7 at another position, for instance at the horizontal top portion of the canoe as seen in the examples of FIGS. 1A-B. It is, however, advantageous if the clasp 7 is positioned within reach of a user who is sitting in and paddles the canoe in case the situation arises where the clasp needs to be tightened during use. It is to be noted that due to the joint strength achieved by the protrusions, grooves and indentations, the locking arrangement 7 mainly has to withstand longitudinal movement and can be made using a relatively simple construction.

Figure 9A:
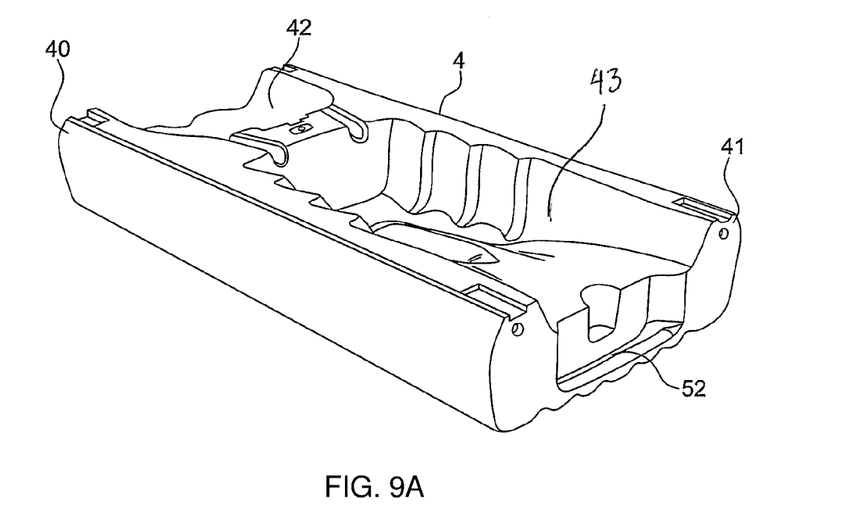
FIGS. 9A-B show a middle hull section according to one embodiment of the invention from two perspective views.
Figure 9B:
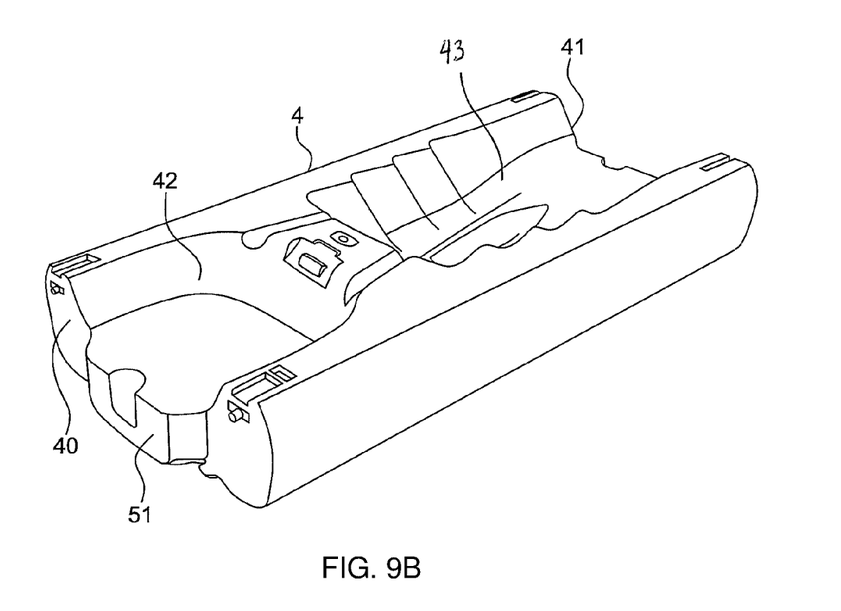

In FIGS. 9A-B there is illustrated a middle hull section 4 according to an embodiment of the invention. As seen herein a middle section 4 comprises a frontal joint portion 40 and a rear joint portion 41 as well as both seat 42 and leg space 43. The joining of a middle hull portion 4 with frontal 2 or rear 3 hulls is accomplished in a corresponding manner as has already been described for joining of a frontal 2 and a rear 3 hulls.

The respective hull sections 2, 3, 4 are preferably manufactured by means of blow molding. According to commonly known procedure for blow molding a mold defining a hull section is provided. The mold comprises two mold halves which are brought together into a unified mold during blow molding procedure. Next, a tube-like piece of plastic is heated and clamped into the mold, whereafter air is pumped into the plastic so that the air pressure pushes the heated plastic out to match the mold thus forming the hull section. The plastic is allowed to cool and harden before the mold halves are separated to eject the blow molded hull section. According to the invention the mold is aligned during blow molding procedure such that the portion of the hull section which comprises the joint portion is kept in a downward orientation and is pointing downwards during the molding procedure. Such alignment leads to that the gravity action contributes to guiding the plastic material to cover the irregularities of the joint features. Each tool half comprises structures for forming the features of said joint including features of said first and second mating means so that the corresponding features becomes integrated parts of the respective hull section during blow molding procedure.

In order to optimize blow molding procedure the tool halves are adapted to promote desired material distribution with regards to the integrated structures in the top deck and the connecting features of the joint. In FIG. 3A, FIG. 5C and FIG. 6 the parting line is drawn on the respective hull sections 2, 3 illustrating the alignment between tool halves. The parting line is denoted 10. As seen in FIG. 3A and FIG. 6 a significant step is created in the parting line 10 where the mold halves come together between the side portion and the bulkhead portion of a hull, resulting in a difference in level along the parting line 10. Hereby it is possible to get the needed strength/plastic thickness where it is desired to make the connection features of the first and second mating means sufficiently strong. This also means that the parting line 10 on the outboard edges of the canoe is raised so that it extends closer to the top deck portion than to the bottom portion of the canoe. This allows the seat, footwells and cargo area to be formed successfully.

In each of the embodiments shown (i.e. canoe comprising two or three hull sections), one of the hull sections 3, 4 is provided with a seat 32, 42 arranged on top of a deck of the section. Thus, the illustrated canoe is a so-called sit-on kayak, but a sit-in kayak having a seat arranged inside the hull section can alternatively be provided using similar joints between the hull sections.

Although all embodiments of the canoe are preferably blow molded in at least two connectable and separable hull sections 2, 3 having mating means molded into a respective bulkhead surface of each section, it will be appreciated that the construction can advantageously be utilized also when building canoes in fiberglass enforced plastic, like polystyrene.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A canoe comprising:
   at least a first hollow hull section comprising a first watertight bulkhead, and a second hollow hull section comprising a second watertight bulkhead, and
   a joint for releasable connection of the first hull section to the second hull section;
   wherein the joint comprises a first mating component comprising at least one protruding member arranged in the first watertight bulkhead and at least one corresponding groove arranged in the second water tight bulkhead, said first mating component being positioned at a lower portion of the respective watertight bulkheads,
   wherein the joint comprises a second mating component separate from the first mating component, comprising at least one projecting member and at least one corresponding indentation positioned at an upper portion of the respective watertight bulkheads,
   wherein the at least one protruding member comprises a horizontally protruding part including an anchoring portion, wherein the anchoring portion is arranged to mate with the at least one corresponding groove and to pivot about a retaining ridge portion withstanding longitudinal forces, and
   wherein the first mating component includes opposing stabilizing surfaces arranged to abut with each other in a locked configuration, which together with further stabilizing surfaces of said respective watertight bulkheads cooperate with said anchoring portion and the at least one corresponding groove to withstand torsional and bending forces.

2. The canoe according to claim 1, wherein the at least one projecting member and the at least one corresponding indentation of the second mating component have a substantially longitudinal mating direction.

3. The canoe according to claim 1,
   wherein the canoe is a sit-on-top canoe,
   wherein each of said hollow hull sections is blow molded, and
   wherein the at least one protruding member, the at least one projecting member, the at least one corresponding groove, and the at least one corresponding indentation are molded into said hollow hull sections so that they are integrated into the first watertight bulkhead and the second watertight bulkhead.

4. The canoe according to claim 1, wherein a height (h) of each of said first hull section and said second hull section is at least 15% of a total length (l) of the respective hull section, and the first mating component is arranged at a lower half of the height (h) of each respective hull section and the second mating component is arranged at an upper half of the height (h) of each respective hull section.

5. The canoe according to claim 4, wherein the height (h) of each respective hull section is at least 20% of the total length (l) of the respective hull section.

6. The canoe according to claim 4, wherein the opposing stabilizing surfaces comprise essentially flat and vertically extending surfaces, wherein the height (x) of said stabilizing surfaces is between $0.7*h-0.4*h$.

7. The canoe according to claim 1, wherein one of the first hull section and the second hull section comprises a frontal hull section, and wherein the opposing stabilizing surfaces comprise oblique side walls and opposing oblique side portions where the oblique side walls have an angle α in relation to a transversal bulkhead wall of the frontal hull section, where α is between 10-85°.

8. The canoe according to claim 7, wherein α is between 30-60°.

9. The canoe according to claim 6, wherein a height (y) of the retaining ridge portion is between $0.05*x$ and $0.5*x$.

10. The canoe according to claim 9, wherein the anchoring portion of the at least one protruding member is arranged to point downwards, and wherein a height (z) of the anchoring portion is between $0.4*y$ and $0.6*y$.

11. The canoe according to claim 1, wherein the at least one protruding member is arranged to extend transversally along a central portion of the lower portion of the first watertight bulkhead.

12. The canoe according to claim 11, wherein the protruding member extends along at least half of a width (w) of the first hollow hull section.

13. The canoe according to claim 1, wherein the first mating component and the second mating component cooperate to withstand substantial vertical-, longitudinal-, side- and torsional forces, and wherein the first mating component is arranged to withstand stronger forces than the second mating component.

14. The canoe according to claim 1, wherein the at least one projecting member and the at least one corresponding indentation of the second mating component are arranged to withstand substantial torsional and vertical forces.

15. The canoe according to claim 1, wherein the at least one protruding member of the first mating component protrudes further in a longitudinal direction than the at least one projecting member of the second mating component.

16. The canoe according to claim 1, wherein the at least one projecting member is positioned at the upper portion of the first watertight bulkhead, and the at least one corresponding indentation is positioned at the upper portion of the second watertight bulkhead.

17. The canoe according to claim 1, further comprising a locking arrangement for locking said first hull section and said second hull section together when they are joined, said locking arrangement including a two-part clasp and being arranged to lock reciprocal movement of said first hull section and said second hull section in a mating direction.

18. The canoe according to claim 1, wherein at least one of the first hollow hull section and the second hollow hull section comprises a seat portion integrated in a top deck structure of the canoe, wherein the seat portion is positioned in between a center of buoyancy of the canoe and a joint portion which comprises said at least one protruding member.

19. A canoe comprising:
- at least a first watertight hollow hull section and a second watertight hollow hull section, and
- a joint for releasable connection of the first watertight hollow hull section to the second watertight hollow hull section;

wherein the joint comprises a first mating component comprising at least one protruding member and at least one corresponding groove, integrally provided in respective one of said first watertight hollow hull section and said second watertight hollow hull section, said first mating component being positioned at a lower portion of the respective watertight hull sections, wherein the joint comprises a second mating component comprising at least one projecting member and at least one corresponding indentation, integrally provided in respective one of said watertight hollow hull sections, wherein the at least one protruding member comprises a horizontally protruding part arranged with an anchoring portion, wherein the anchoring portion is arranged to mate with the at least one corresponding groove and to pivot about a retaining ridge portion withstanding longitudinal forces, and wherein the first mating component is arranged with opposing stabilizing surfaces arranged to abut with each other in a locked configuration and cooperate with said anchoring portion and said at least one corresponding groove to withstand torsional and bending forces, wherein one of the first hull section and the second hull section comprises a frontal hull section, and wherein the opposing stabilizing surfaces comprise oblique side walls and opposing oblique side portions where the oblique side walls have an angle $\alpha$ in relation to a transversal bulkhead wall of the frontal hull section, where $\alpha$ is between 30-60°.

* * * * *